United States Patent [19]

Cornell

[11] Patent Number: 5,894,041
[45] Date of Patent: Apr. 13, 1999

[54] MULTI-LAYER LAMINATED PREFORM AND METHOD OF ITS MANUFACTURE

[75] Inventor: Stephen W. Cornell, Naperville, Ill.

[73] Assignee: Crown Cork & Seal Technologies Corporation, Alsip, Ill.

[21] Appl. No.: 08/540,874

[22] Filed: Oct. 11, 1995

[51] Int. Cl.⁶ .......................... B29D 22/00; B29C 39/00
[52] U.S. Cl. .................. 428/35.7; 428/36.9; 428/36.91; 428/161; 428/339; 428/542.8; 215/12.2; 215/379; 264/523; 264/512
[58] Field of Search ..................... 428/35.7, 36.9, 428/36.91, 542.8, 36.6, 36.7, 161, 163, 339; 264/523, 532, 537, 512; 215/12.2, 379

[56] References Cited

U.S. PATENT DOCUMENTS

| 4,307,137 | 12/1981 | Ota et al. ........................ 428/161 |
| 4,424,834 | 1/1984 | Sumi et al. ....................... 428/542.8 |
| 4,847,129 | 7/1989 | Collette et al. .................... 428/542.8 |
| 4,948,016 | 8/1990 | Summons et al. ................. 428/163 |
| 4,980,100 | 12/1990 | Krishnakumar et al. .......... 264/25 |
| 5,508,076 | 4/1996 | Bright ............................... 428/524.8 |

FOREIGN PATENT DOCUMENTS

| 900 157 | 1/1985 | Belgium . |
| 0 465 356 B1 | 6/1994 | European Pat. Off. . |
| 30 02 189 C2 | 5/1984 | Germany . |
| 62-256631 | 11/1987 | Japan . |
| 6-199333 | 7/1994 | Japan . |

Primary Examiner—Rena L. Dye
Attorney, Agent, or Firm—Woodcock Washburn Kurtz Mackiewicz & Norris LLP

[57] ABSTRACT

A blank (2) is molded for the manufacture of a multi-layer preform (1). The blank possesses protrusions (5). After the protrusions (5) have been brought to a plasticised state under the action of heat, those surfaces that contain protrusions (5) are covered by a layer of plasticised material. The blank (2) becomes connected to the layer (6) in the area of the protrusions (5). After cooling of the preform created from the blank (2) and the layer (6), the blank (2) will be connected with the layer (6) by means of microweld positions (7) in the area of the said protrusions (5). With that, delamination of the preform (1) during further processing or use will be effectively prevented.

9 Claims, 8 Drawing Sheets

MULTI-LAYER LAMINATED PREFORM AND METHOD OF ITS MANUFACTURE

BACKGROUND OF THE INVENTION

1. Field of the Invention

The invention concerns a multi-layer laminated preform and a method of its manufacture, as well as a method of manufacturing a container, and an accordingly manufactured container.

Multi-layer preforms as a start product for the manufacture of hollow containers such as bottles are known in various embodiments. Containers manufactured from preforms comprising several layers of differing materials will have different advantages. A combination of physical properties can be attained, for example, that cannot be achieved with a single material. Thus, materials with high heat resistance, for example, are combined with materials possessing good gas tightness or high mechanical loading capacity. Another possibility is the use of different layers of the same material, such as layers of recycled material and layers of virgin material.

The problem in the case of multi-layer containers concerns separation of wall layers, in other words delamination. For example, in the case of inhibiting the gas leakage or permeation between two layers of a container such as PET, if a gas barrier material is applied, then there will be a subsequent risk of separation of these layers during processing of the preform or storage of the container. In order to prevent such delamination, the layers can be joined together by means of an adhesive layer. Such as when copolymers containing maleic anhydride are used to adhere EVOH to polyolefins or polyesters. This requires a further layer, however, and will result in an unnecessary complication of the manufacturing process.

U.S. Pat. No. 4,980,100 discloses a multi-layer container with which delamination is prevented through the application of small perforations to the outer layer. These perforations, which approximately extend into the main delamination zone, permit the escape of gas that has collected between two layers of different gas permeability. In this way, delamination should be prevented. This method has the disadvantage that a further process step is required after completed manufacture of the container, in order to apply such apertures to the outer layer of the container.

SUMMARY OF THE INVENTION

The object of the invention is to avoid the disadvantages of the state of the art and to create a method for the manufacture of a multi-layer laminated container or preform that can be economically and simply carried out, wherein a delamination of the different layers of the said container is reliably prevented.

It is a further object of the invention to create a preform from which a container can be manufactured, wherein no delamination of the different layers will arise.

It is a further object of the invention to create a method of manufacturing a container and an accordingly manufactured multi-layer laminated container which can be manufactured in a simple way and wherein delamination of the different layers is reliably avoided. According to the invention, these objects are particularly fulfilled in accordance with the characteristics of the independent patent claims.

A single-layer blank is formed as a first step in a method for manufacturing a multi-layer laminated preform. For the manufacture of hollow bodies, the blank itself is preferably a hollow body and has an inner and outer surface. With the manufacturing process, however, multi-layer laminated planar blanks can also be manufactured.

The blank for the manufacture of hollow bodies is provided with protrusions on its inner and/or its outer surface.

In a subsequent working step, the blank is subjected to heating in such a way that the protrusions reach a temperature in which they assume a plasticised or melted state. Since the protrusions possess less mass in comparison to the body of the blank, on the application of heat they will be heated more rapidly than the rest of the body, and thus plasticised or melted. The amount of heat required for melting the protrusions is less than that required for melting the entire blank.

In a further working step, the blank is covered with a layer of plasticised or liquid material such as a molten polymer on the surface that possesses the protrusions. With that, the blank will form one layer of a laminated preform, and the covering layer will form a further layer of the preform.

Because the protrusions are partially plasticised or in a softened state, and because the covering layer is likewise applied in the form of plasticised material, a connection, in the form of local weld positions in the area of the protrusions on the blank, will arise between the two layers. The two layers will become connected by means of these microweld positions. In a final process step, the multi-layer preform thus formed is cooled. In this configuration, the preform can be stored or transported, and is also suited to further processing, for example for the application of one o more further layers.

In a preferred method according to the invention, a blank in the form of a hollow body is manufactured by means of injection molding. In an initial procedural step, plasticize material is injected into a mold cavity. The core of the too possesses a smooth surface, and the mold is gently conical in shape so that the blank can be removed from the core axially. In order to manufacture the protrusions on the outer surface of the blank, the surface of the injection molding tool forming the outer wall of the preform, is provided with irregularities, preferably with regularly arranged indentations or tectural pattern. In order to be able to remove a blank that has been injection molded in this way from the injection molding tool, the tool is opened radially and the size of the projections is small enough to avoid tool removal obstruction.

Subsequently, the blank, the protrusions of which have been previously brought to a plasticised condition, is introduced into an injection molding tool that possesses a greater inside diameter than the outside diameter of the blank. In this step, the blank assumes the role of the core of an injection molding tool. Plasticised material is injected into the cavity between the wall of the tool and the outer wall of the blank. Because the protrusions of the blank are in a softened state or will be by virtue of the heat energy of the covering layer melt and the thinness of the protrusions in a softened state connections will arise between the covering layer and the blank, in the region of the protrusions. The covering layer material will be pressed, in a plasticised state, onto the surface of the blank and will become connected with the said surface at spots or in zones. After cooling of the preform formed in this way, a multitude of microweld spots and microweld positions will arise between the two layers.

In an alternative embodiment, a blank for the manufacture of a hollow body is provided with protrusions on its inner surface. To that end, a conventional injection molding tool with a smooth casing surface is used, and a core which, on its surface, possesses regular recesses. For removal from the mold, the core of the tool must be collapsible, so that the protrusions manufactured by the injection molding process on the inner side of the blank are released from the surface of said core.

The protrusions on the inner side of the blank are, after removal of the blank from the tool, heated and plasticised.

In a subsequent procedural step, a second tool core that possesses a smaller outer diameter than the first core is introduced into the blank. Plasticised plastic is injected into the cavity formed by this second core and the inner surface of the blank. Since the protrusions of the blank and the injected inner layer are in a plasticised state, the blank will become connected to the inner layer in the region of the protrusions. The second core is removed from the preform thus formed, and the preform is cooled. After cooling, the inner layer will be connected with the blank by microweld positions in the form of spots or zones.

The manufacture of a preform that comprises more than one layer is also conceivable, with that, the blank can be provided with protrusions on both its inner and outer surfaces. Such an arrangement is attained when not only the core, but also the surface of the injection molding tool forming the outer wall of the preform, is provided with recesses. In a similar way to the methods described above, the blank is provided with an inner and an outer layer that connect with the blank by means of microweld positions in the form of zones or spots.

It is a principle feature of the invention that the layers of the preform are connected to each other via spot or zone shaped microweld positions, without at the same time the method being limited to a specific type of manufacture of the blank or a specific type of application of a layer or layers. A method is advantageous wherein the protrusions on the inner or outer surfaces of the blank are formed with a circular cross section and, with that, are vertical in relation to the surface of the blank.

In a particularly preferable method, the protrusions possess a scaled structure. In this way, particularly good connection between the different layers of the preform can be attained, since the different layers, in addition to the (thermally produced) welded connection, will interlock with each other.

In a further embodiment, a conventional blank is manufactured in an initial step, said blank possessing not only a smooth outer surface, but also a smooth inner surface. The irregularities or protrusions on the inner and/or outer surfaces of the blank can be created by the application of mechanical force onto the blank subsequent to the injection molding process. The surface of the blank can, for example, be passed over a roughened surface, by which means the surface of the said blank will be roughened as in a grinding process. In a similar way, the inner surface of the blank can be provided with roughness in that the inner surface is guided around a rod with a roughened surface. The subsequent procedural steps are carried out in a similar way to the method described above.

In order to heat the protrusions on the inner surface and/or the outer surface of the blank, basically any state of the art heating method can be employed. Prior to insertion into the second injection molding tool, the surface of the blank can, for example, be heated in a simple way by means of a gas flame, microwaves, and high frequency or infrared radiation. Heating of the surface of the blank, however, is also conceivable within the second injection mold. Heating can also be imparted onto the inside of a mold by means of corona discharge, for example between surfaces that lie opposite on another.

If the blank is to be heated on its innermost surface, heating by means of induction coils can be considered. By induction an alternating field is generated in a metal rod arranged within the blank.

In a particularly preferable method, the heat energy contained within the plasticised second layer during application, and in particular during injection molding, is used for melting the irregularities or protrusions of the blank. The number of steps in the method will be accordingly reduced. Melting of the surface of the blank ensues in the same step as the application of the second layer of the preform.

Instead of providing a blank with protrusions, it is also thinkable to heat the surface of the blank in a regular pattern. The surface will be softened or plasticized in a regular pattern of limited surface spots or zones.

Heating of the surface in a pattern can be made by using a IR radiation source radiating through a mask of the desired pattern.

A preform manufactured by the method according to the invention for blow molding of a hollow body possesses two or more layers. The two layers are connected in such a way that, during stretching and blowing of the preform to create a container, the two layers will not separate. This is achieved through the mutual engagement of one surface of each of the two layers, to thus form a mean connecting zone. The connecting zone is formed by a plurality of microweld positions in the form of spots or zones.

The weld positions can comprise protrusions on the surface of one layer that engage with complementary depressions that lie upon the surface of the other layer. Not only can the protrusions be accommodated on the outer surface of the inner layer, but also on the inner surface of the outer layer.

The protrusions having x, y and z dimensions may particularly possess the following approximate dimensions: in surface dimensions: x from 0.030 to 0.3 inches (0.75 to 7.5 mm), y from 0.030 to 0.3 inches (0.75 to 7.5 mm) and z from 0.10 to and z from 0.10 to 0.60 inches (0.25 to 1.5 mm).

For the manufacture of a multi-layer laminated hollow body wherein the individual layers will not separate from each other, in an initial step a multi-layer laminated preform is manufactured according to the methods described above. After cooling of the preform, the said preform is stretched and/or blown, by means of a conventional blow molding method, to create the hollow body desired. Delamination between the different layers during stretching and/or blowing of the preform to create the desired hollow body is prevented through the connection of the layers of the preform by means of microweld positions and, if necessary, also by means of further mutual mechanical engagement.

A container, manufactured from a preform according to the invention, or by means of the method according to the invention, is thus distinguished by a plurality of layers that are connected with spot or zone shaped microweld points. The said layers are connected in such a way that delamination is reliably prevented. The layers of the container can also mutually engage, each with one surface, by means of complementary protrusions/depressions, in such a way that a connecting zone is formed in the engagement area. To form the container, a preform is blown and/or stretched or enlarged otherwise. The draw ratio may usually vary from 1:3 to 1:12 depending on the method and the specific form or portion of a container. This means that the distance between the microwelded spots is increased during the manufacturing process by about the same draw ratio. Preferable the density of the spots is about 800 to 32 per CM, preferably about 90 on the preform. This leads to a density of 80 to 3, preferably 8 per cm on the bottle, depending on the draw ratio. The distance between individual spots is preferably between 0.05 cm and 0.7 cm and particularly about 0.25 cm.

The weld connection is located mainly in the area of the surface of the protrusions or depressions.

All polyesters or polyamides that have a Tg (glass transition temperature) and/or are crystalline or crystallisable can be used to form the blank.

As covering layer, all barrier olefine that can be melted to plasticize the blank (resp. its protrusions) or all melts that can soften the barrier defines and bond/transesterify may be used.

The following materials are particularly suitable for the layers of the blank and preform:

Condensation polymers containing esters or amide linkages, especially PET and its copolymers, also ethylenic polymers containing vinyl alcohol linkages (EVOH).

The invention is more closely explained in the following embodiments and with the aid of the drawings, namely:

DESCRIPTION OF THE PREFERRED EMBODIMENT

Figure 1A:
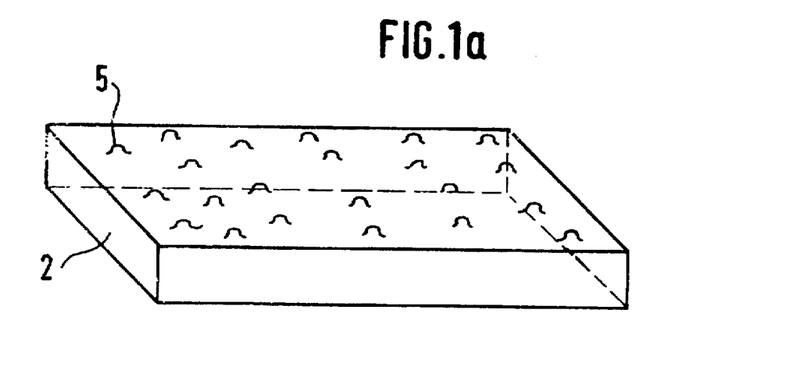
FIGS. 1a to 1c a schematic representation of the procedural steps in the case of a planar section of a preform.
Figure 1B:
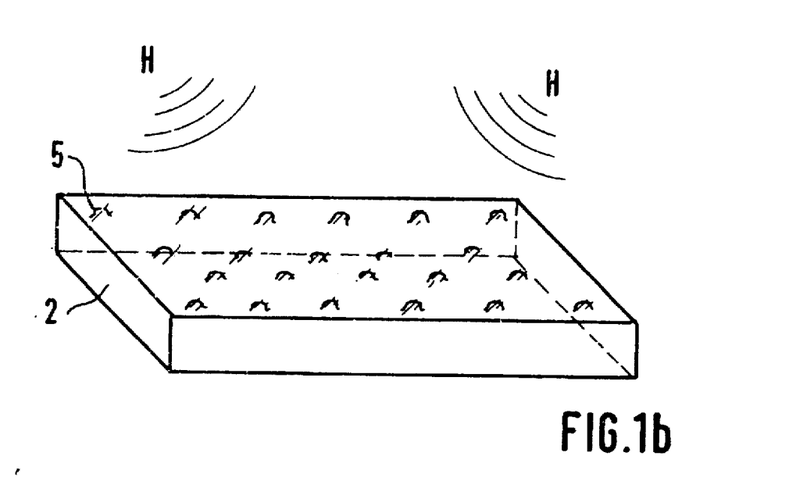
Figure 1C:
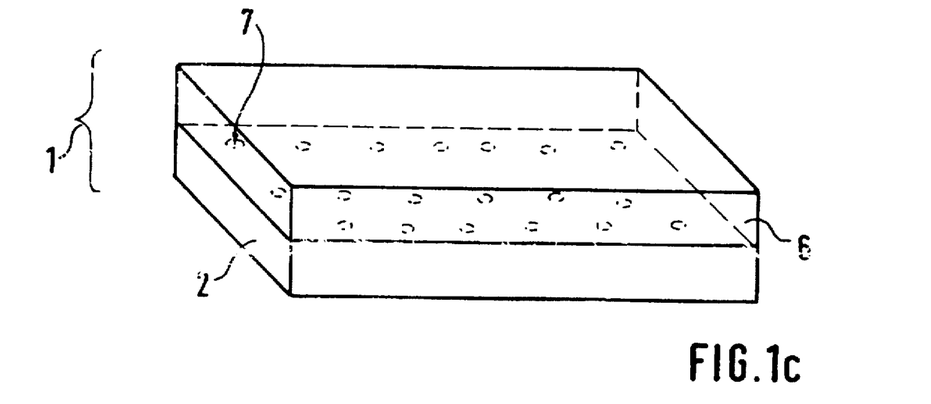

FIGS. 1a to 1c schematically show the sequence of a method of manufacturing a multi-layer laminated preform. The procedural steps are shown on the basis of a rectangular section from the wall of a preform 1. In an initial step, a blank 2 is manufactured, said blank possessing protrusions 5 on one or both surfaces. The blank can, for example, comprise PET. In the case of a blank with a thickness of approximately 2.5 mm, protrusions 5 are preferably selected that protrude by approximately 0.75 mm from the surface of the blank and possess a cross-sectional area of approximately 0.5 to about 44 mm². The concentration of protrusions 5 on the surface of the blank amounts to approximately 800 to 32, preferably 90 per cm², depending on the stretch or draw ratio. The distance between two protrusions may vary from about 0.25 mm to 7.5 mm, preferably from 0.5 mm to 2.5 mm. The protrusions 5 can, for example, be arranged with a right-angled grid. A circular or a random arrangement is also conceivable. The blank 2 is thus preferably connected with the layer 6 by protrusions 5 throughout 5% to 50% of the common contact surface.

The protrusions 5 can be created during the process of manufacturing the blank 2, or can also be subsequently mechanically applied after its manufacture. In a subsequent procedural step, by means of a radiation source with a temperature of about 100°–150° C., the blank 2 is subjected to the action of heat H in such a way that the protrusions 5 attain a temperature at which they become plasticised. Since the protrusions 5 possess less mass and protrude from the surface of said blank 2, under the action of heat they will attain a plasticised state more rapidly than the body of the blank 2. The duration of heat action is so selected that only the protrusions 5 assume the said plasticised state, while the body of the blank 2 retains its solid property.

In a further procedural step, a second layer 6 of a plasticised material is applied to the surface of the blank 2. Preferably RPET is used as the second layer. A first layer made of RPET or PEN, and a second layer made of PET or PEN, is also conceivable. RPET is recycled PET, PEN means 100% PEN or copolymers of NDC with PET, spanning the range of 2% N to 90% N. The layers conform to the surface of the blank 2. The protrusions 5 and the layer 6 become molten or plasticized. They thus melt together. After cooling of the preform 1 comprising the blank 2 and the layer 6, these two components will be connected by means of microweld positions 7, said microweld positions 7 being located at those positions where the blank 2 was provided with protrusions 5. After cooling, the preform 1 can be placed in storage, transported or subjected to further processing. Due to the microweld positions 7, there will be no risk of separation of the two layers (blank 2, covering layer 6) of the preform 1 during further working.

FIGS. 2a to 2d show a preferred embodiment of the method for the manufacture of a preform 1 by injection molding. In an initial step, a layer of plasticised material is injected into a mold cavity, said cavity being formed by the inner surface 8 of a tool 13 and a core 12. The core possesses a smooth surface. The inner surface 8 of the tool 13 is provided with irregularities, for example in the form of indentations. The plasticised material injected into the cavity forms a blank 2. The blank 2 has a smooth inner surface 3 and an outer surface 4 which, due to the irregularity of the inner surface 8 of the tool 13, is provided with protrusions 5. In order that the blank 2, notwithstanding the irregular structure on its outer surface 4, can be removed from the tool 13, the tool is configured to open radially.

The blank 2 formed in this way is removed from the tool 13 and subjected to the action of heat in a further procedural step. The heat energy can, for example, be applied using an infra-red lamp, said lamp being schematically depicted in FIG. 2b by the letter H. Under the action of heat, the protrusions 5 become molten and plasticised. The supply of heat is interrupted prior to softening of the body of the blank 2. The blank 2, with plasticised surface, is inserted into a second tool 13, said tool possessing a larger inside diameter that the outer surface 4 of the blank 2. A layer 6 of plasticised material is injected into the cavity, said cavity being formed by the inner surface 81 of the second tool 131 and the outer surface 4 of the blank 2. The plasticised material conforms to the outer surface 4 of the blank 2 and melts with the blank 2 in the region of the protrusions 5. The blank 2 and the covering layer 6 thus form a double-layer preform 1 for the manufacture of a hollow body. The preform 1 is removed from the tool 131 and cooled. Microweld positions 7 in the area of the melted protrusions 5 (FIG. 2a) connect the two layers of the preform 1 together. Separation of the layers of the preform 1 from one another in the course of further processing steps (for example blow forming) is prevented due to these microweld positions 7.

The preform 1 can, at its open end, be provided with a opening portion or a so-called finish, for example a screw thread or a retaining bead. Such a finish can actually be formed during injection molding of the outer layer by means of a suitable injection molding tool (not shown in the drawings). The finish can, however, also be subsequently applied to the finished preform 1 by means of pressing or cutting. The preform can possess a multi-layer structure over its entire length. Also conceivable is the exclusion of that section where the finish is applied (thread, retaining bead) from the covering layer.

In FIGS. 3a to 3d, an alternative method to that shown in FIGS. 2a to 2d is shown. Here, a blank 2 is manufactured with a smooth outer surface 4, said blank possessing protrusions 5 on its inner surface 3. With that, in an initial step, a layer of plasticised material is injected into the cavity formed by the inner surface 8 of a tool 13 and a core 12. The inner surface 8 of the tool 13 possesses a smooth surface structure, and the core 12 has irregularities on its surface in the form of indentations. In order that the core 12 can be removed from the blank 2, notwithstanding the engagement of the protrusions 5 of the blank in the indentations of the said core, a collapsible core is selected. After the blank 2 has been removed from the tool 13, and after the core 12 has been removed from the blank 2, the inner surface 3 of the blank 2 is heated to melting temperature by a rod-type heating element. The inner surface 3 is heated for sufficient time until the protrusions 5 assume a plasticised state. In a further process step (FIG. 3c), a second core 12' is introduced into the blank 2. The core 121 has a smooth surface and possesses a smaller outer diameter than the inside diameter of the blank 2. A layer 6 of plasticised material is injected into the cavity formed by the surface of the core 121 and the inner surface 3 of the blank 2. In the area of the protrusions 5 of the blank 2, the plasticized material melts together with the said protrusions. After cooling of the multi-layer preform 1 formed from the blank 2 and the layer 6, both these layers will be welded together by means of microweld positions 7.

Figure 2A:
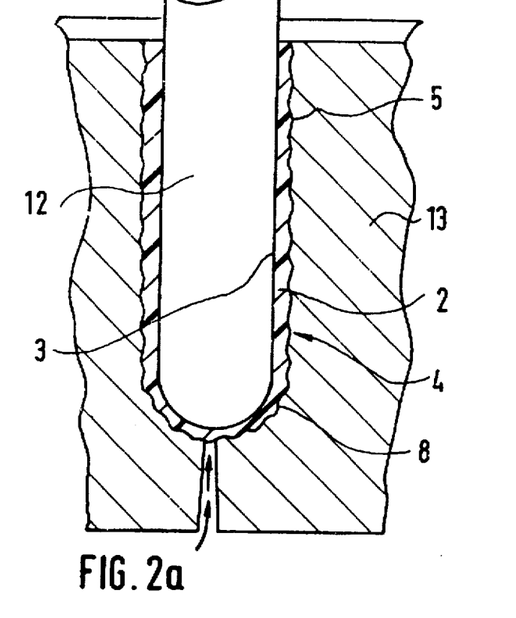
FIGS. 2a to 2d procedural steps of a particular version of the method for the manufacture of a hollow body.
Figure 2B:
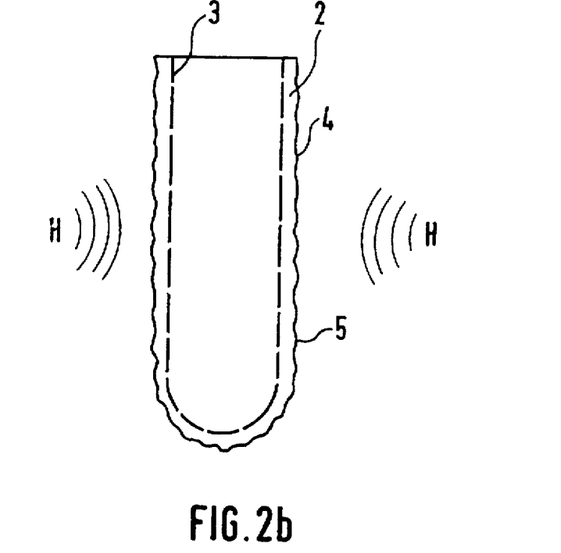
Figure 2C:
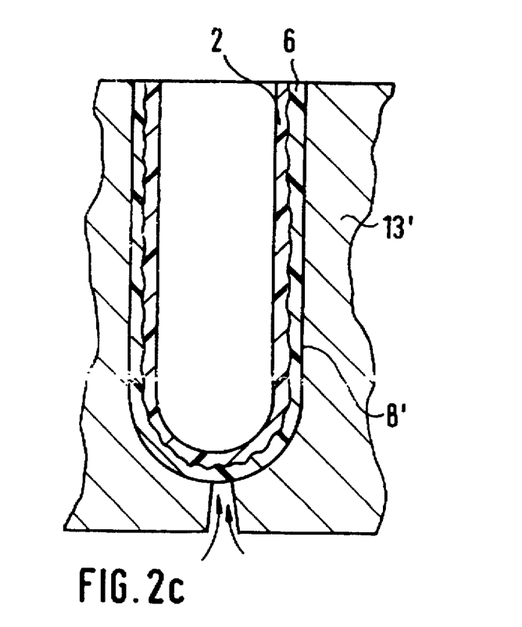
Figure 2D:
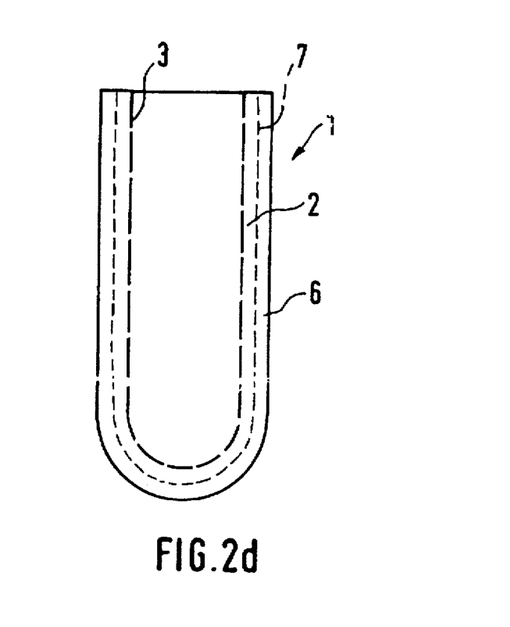
Figure 3A:
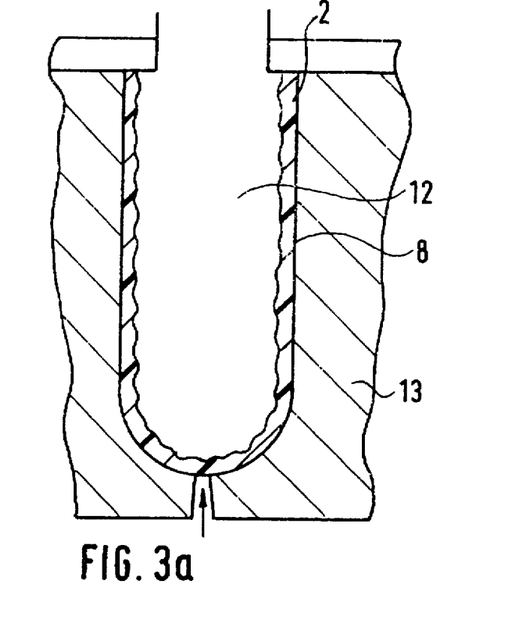
FIGS. 3a to 3d an alternative method to that shown in FIGS. 2a to 2d.
Figure 3B:
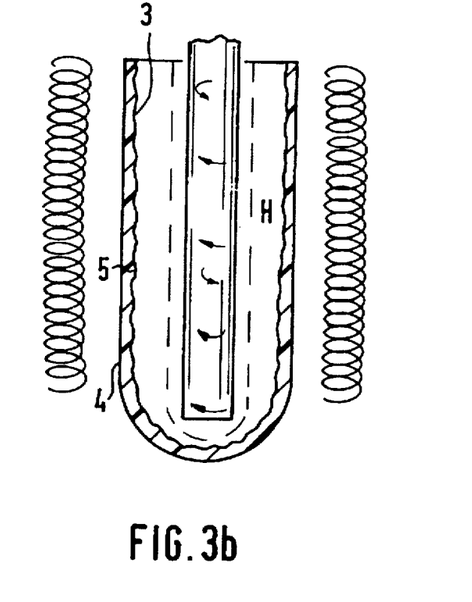
Figure 3C:
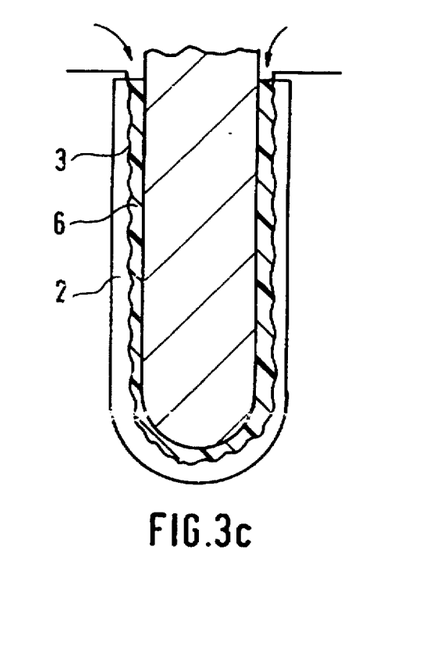
Figure 3D:
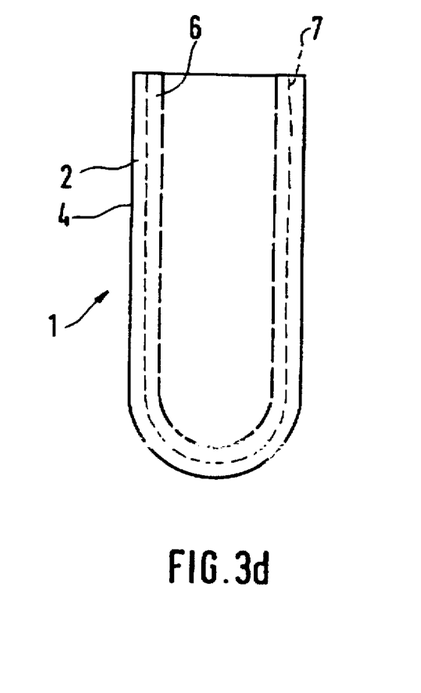

Not only in the case of the methods shown in FIGS. 2a and 2d, but also in the case of the methods shown in FIGS. 3a and 3d, the heating phase shown under FIG. 2b, respectively 3b can be foregone if the heat energy contained in the plasticised layer 6 is sufficient to heat or melt the protrusions 5.

Figure 4A:
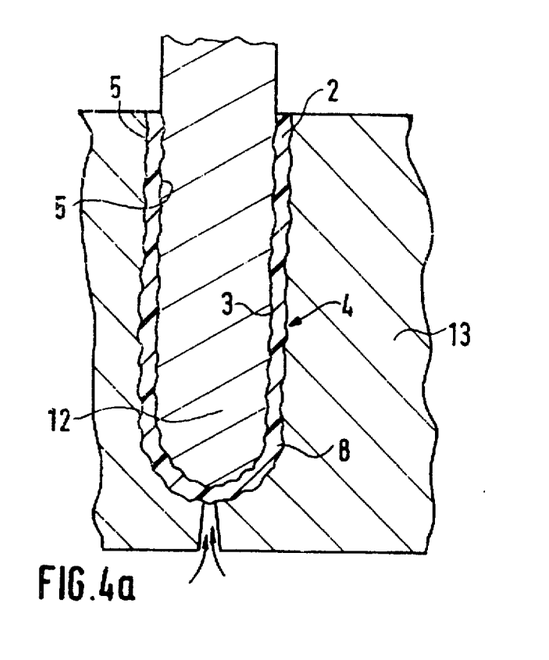
FIGS. 4a and 4b a blank for a triple-layer preform, and a triple-layered preform.
Figure 4B:
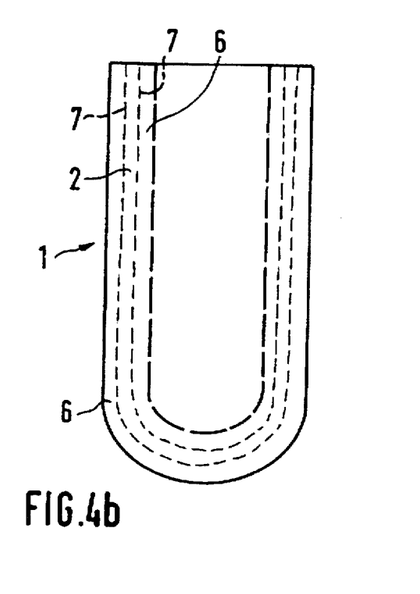

FIG. 4a shows A method for the manufacture of a blank 2 for molding a triple-layered preform 1. With that, a blank 2 is manufactured that possesses protrusions 5, not only on its inner surface 3, but also on its outer surface 4. The method is similar to that shown in FIGS. 2a to 2d, or 3a to 3d. In order that the preform 2 can be removed from the tool 13, said tool 13 comprises two or more sections and can be opened. For removal from the blank 2, the core 12 is collapsible. In further procedural steps, a further layer 6 is applied to the inner and outer surface of the blank 2. The method in this respect is similar to that described for FIGS. 2c and 3c. In this way, a triple-layer preform 1 is manufactured, the layers of which are connected together by means of microweld positions 7 (See FIG. 4b).

Figure 5A:
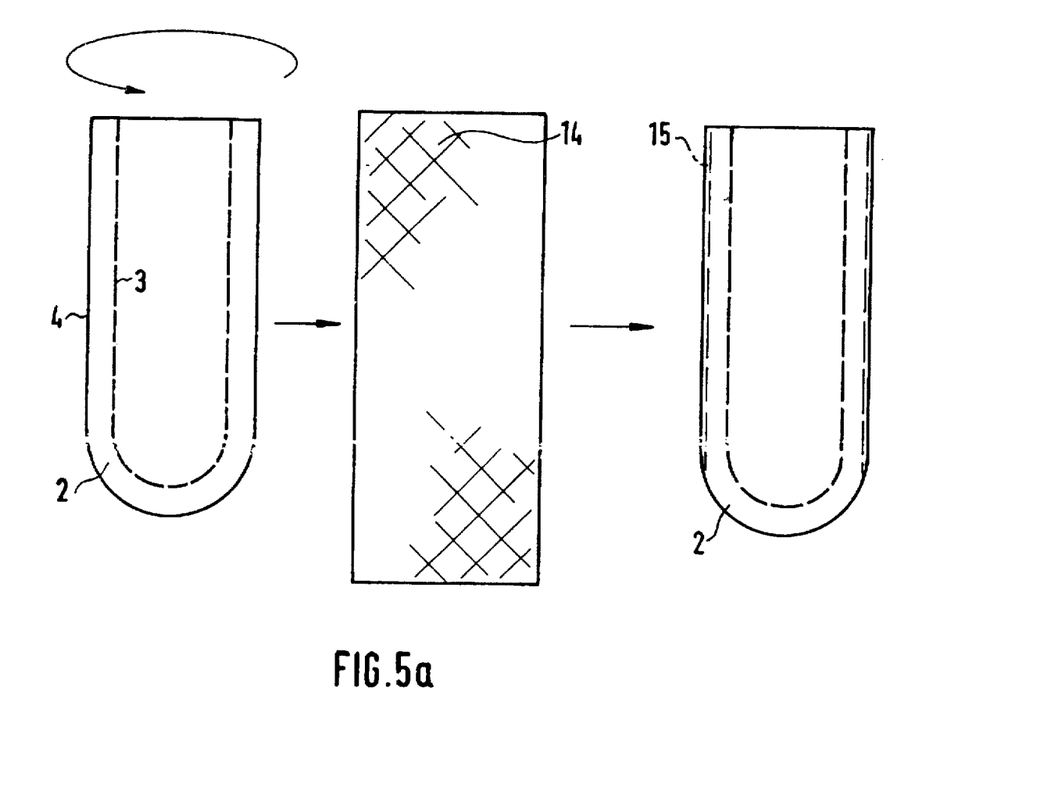
FIG. 5a an alternative method for roughening the surface of a blank.

FIG. 5 shows an alternative method for creating the protrusions 5 on the outer surface 4 of a blank 2. A normal blank 2 is used here, said blank not only possessing a smooth outer surface 4 but also a smooth inner surface 3. The outer surface of the blank 2 is passed over a roughened surface 14. With this sequence, the outer surface 4 of the blank 2 becomes roughened, as in a grinding procedure, to thus form a zone of irregularities 15 made up of small protrusions and indentations. A similar method can also be used in order to roughen the inner surface 3 of a blank 2.

Figure 5B:
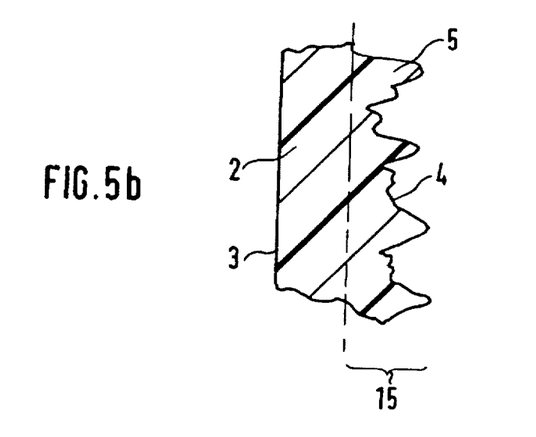
FIG. 5b a cross section through the wall of a blank with roughened surface.

FIGS. 5a and 5b show a detail of said zone 15 at an enlarged scale. The protrusions produced by the grinding process can be observed here. The protrusions 5 extend approximately 1.0 mm from the surface 4 of the blank 2, and have a mean cross-sectional area of 5 mm$^2$. The density of the larger protrusions (greater than 1.0 mm) is about 4–10 per cm$^2$ with a distance from 0.5 mm to 7.0 mm between the protrusion 5.

The surfaces of a blank can, however, also be provided with irregularities by means of alternative mechanical methods, for example stamping or cutting.

Figure 6A:
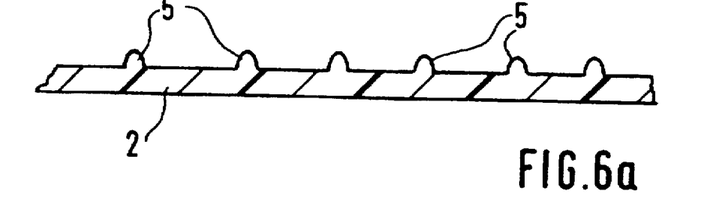
FIGS. 6a and 6b a cross section through the surface of a blank with protrusions.
Figure 6B:
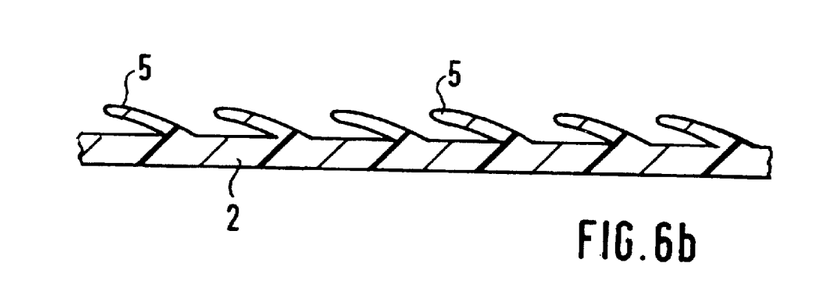

FIGS. 6a and 6b show details of a blank manufactured by the methods according to the invention. The blank possesses protrusions 5 on one of its surfaces. As in FIG. 6a, these protrusions 5 can protrude vertically from the surface of the blank 2 and possess a circular cross section. In a preferred embodiment (FIG. 6b), the protrusions 5 are arranged in the form of scales.

Figure 7A:
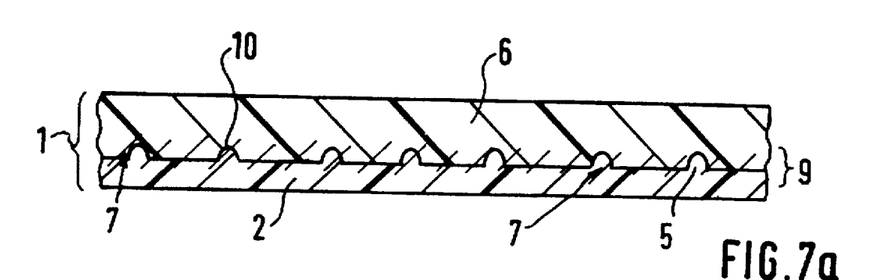
FIGS. 7a and 7b a cross section through a preform from the blank according to FIGS. 6a and 6b.
Figure 7B:
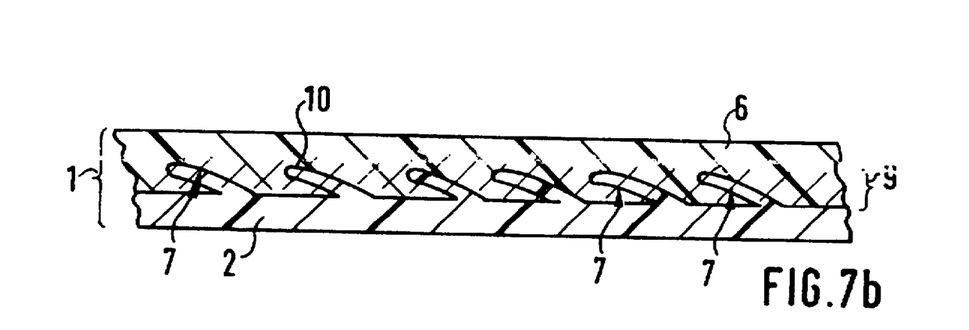

In FIG. 7a and 7b, a detail is shown from a preform 1 which has been manufactured according to a blank of FIG. 6a or 6b. The blank 2 is covered by a layer 6. The layer 6 has indentations 10 that are complementary to the protrusions 5. The blank 2 is connected with the layer 6 by means of microweld positions 7 in the area of the protrusions 5, respectively the indentations 10. In this way, a connecting zone 9 is formed, in which both layers are firmly connected to each other. The connection comprises microweld positions 7 in the area of the protrusions 5, respectively the indentations 10. In the preferred embodiment according to FIG. 6b, the covering layer encloses the scale-like protrusions 5 on one surface of the blank 2. On the one hand, both the layers are held together by microweld positions 7, and on the other hand, the connection is additionally strengthened by the interlocking engagement of both the said layers.

Figure 8:
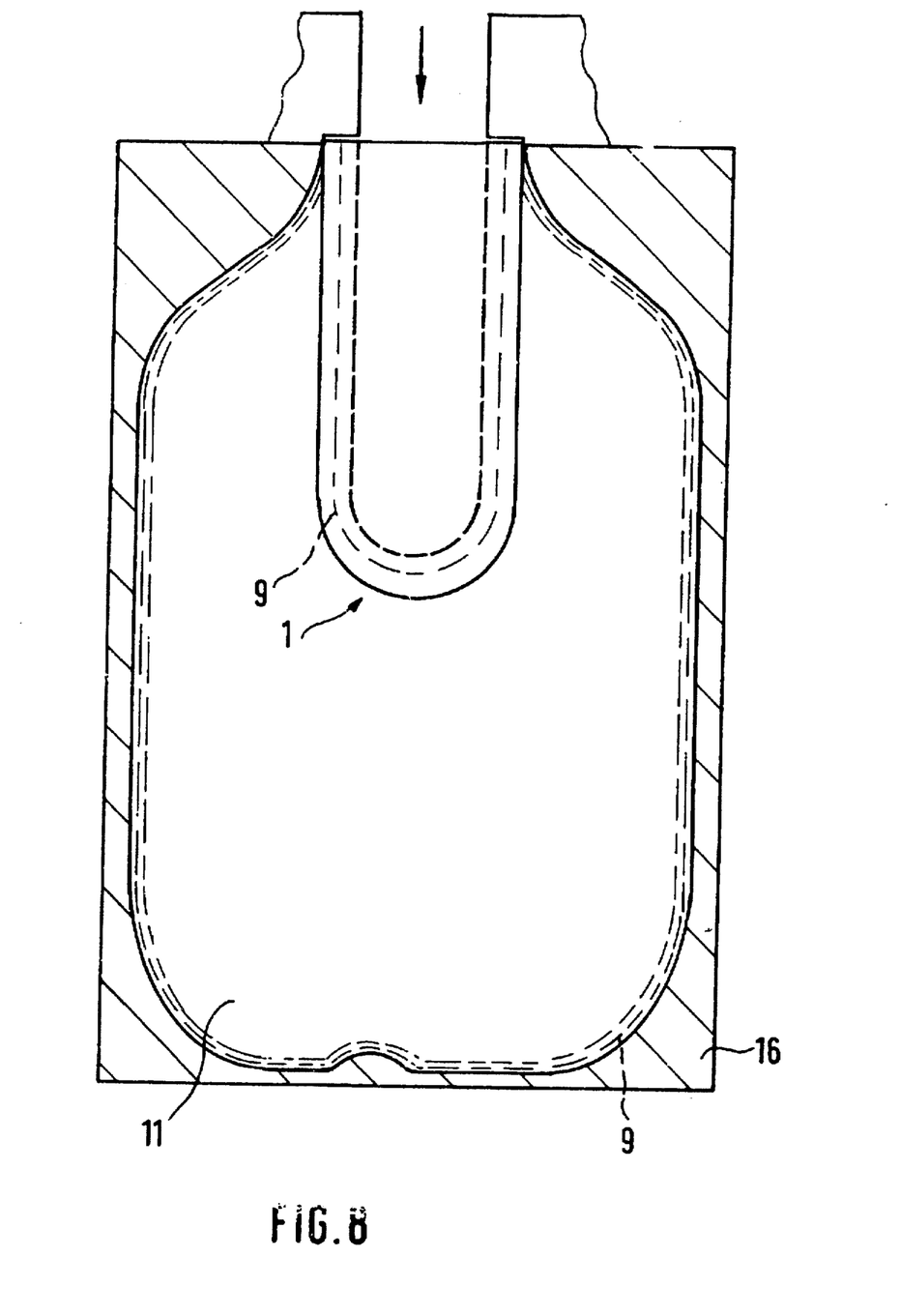
FIG. 8 a schematic representation of the blowing procedure for the manufacture of a hollow body from a preform.

FIG. 8 schematically shows the sequence for the manufacture of a multi-layer, laminated container 11 from a preform 1. The preform 1 is subjected to heat and blown into shape 16 with the aid of compressed air. By means of the connection of the layers of the preform 1 in the area of a connecting zone 9, separation of the layers of the preform 1 from one another during blowing is prevented. Prevention of layer separation with the finished container 11 during use will also be prevented due to the said connecting zone 9.

In place of the above mentioned blow molding method, the container can also be formed by stretch blow molding. An injection stretch blow method is also conceivable, with which the preform 1 is not cooled after manufacture, but is blown into bottle shape in an immediately subsequent procedural step.

Figure 9:
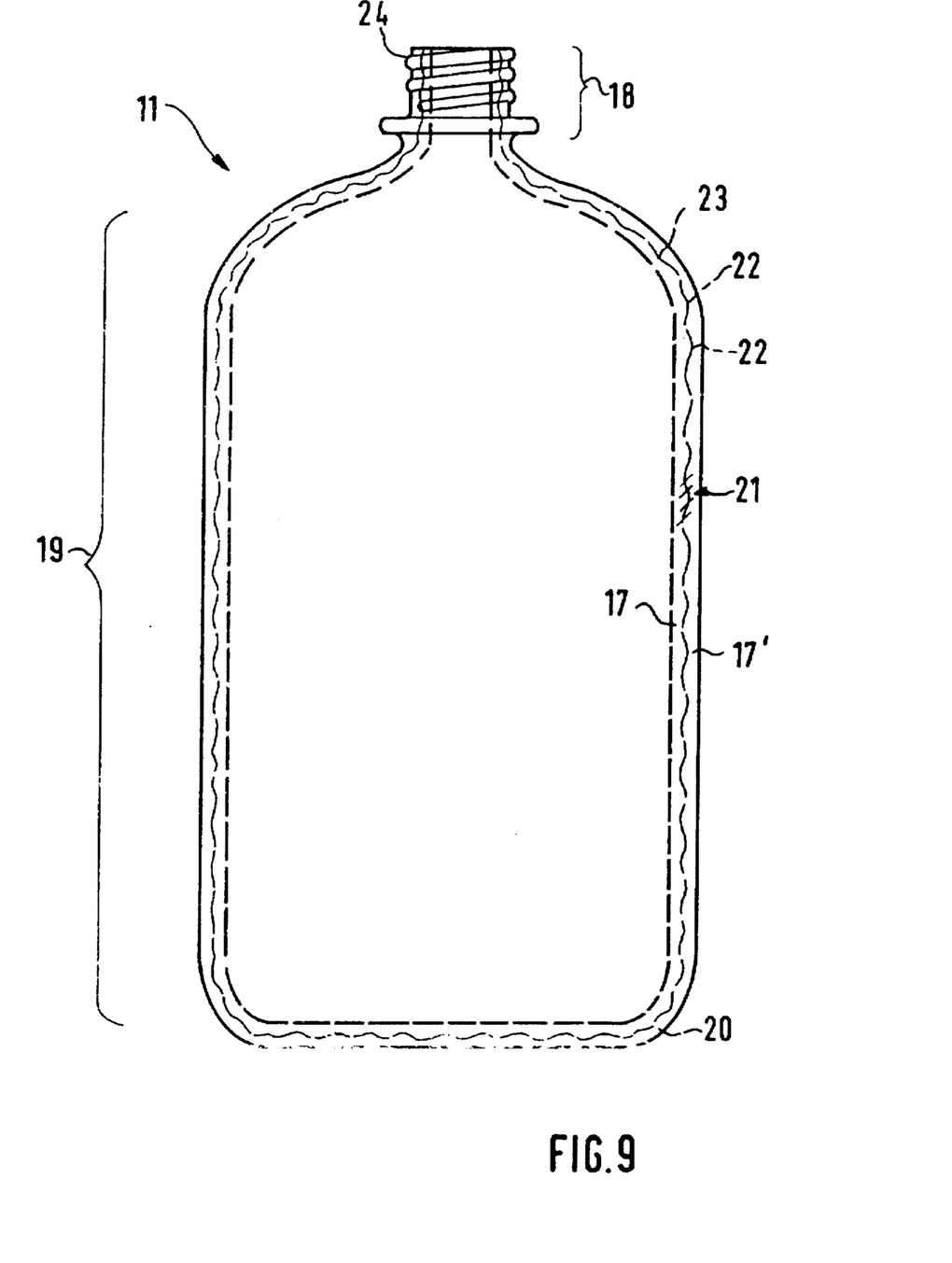
FIG. 9 a schematic representation of a container.

FIG. 9 shows a container 11 with a mouth area or finish 18, an approximately cylindrical body 19 and a base 20. The container 11 comprises at least two layers 17, 17' which are connected to each other in a connecting zone 21. Both the layers 17, 17' are connected to each other in the area of the connecting zone by means of microweld positions. The microweld positions are formed by protrusions 22 on the surface of one layer 17, which engage with complementary depressions 23 on the surface of the other layer 17'. Separation of both layers 17, 17' of the container from one another is prevented by means of the microweld positions. In the area of the finish 18, the container 11 is provided with a thread.

In addition to the connection by microweld positions, the layers adhere to each other by adhesion forces.

Figure 10:
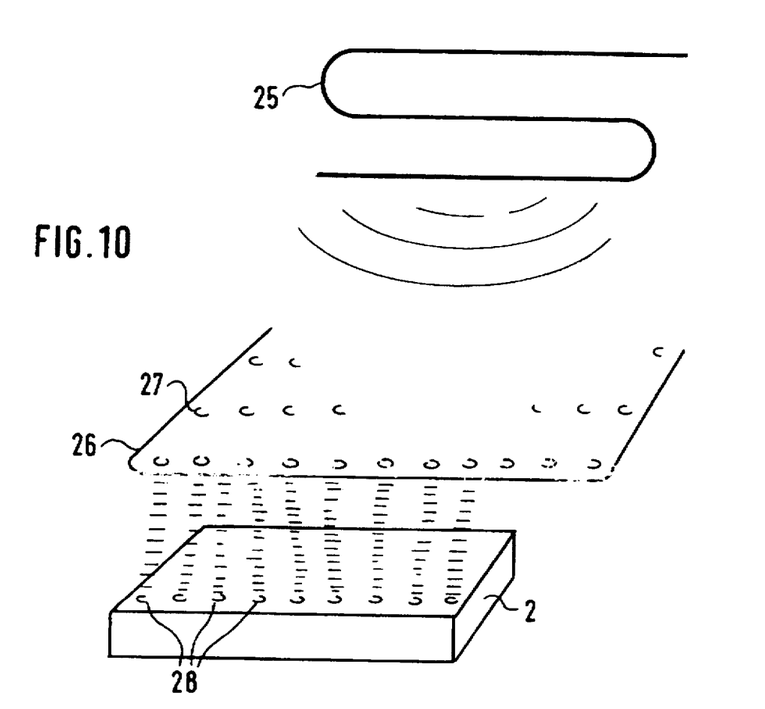
FIG. 10 a schematic representation of an alternative heating step.

FIG. 10 shows schematically an alternative method for heating the blank 2. The step is shown on the basis of a rectangular section from the wall of the blank 2.

The blank 2 has a smooth surface which is heated with a radiation source (e.g. IR lamp) 25.

The radiation source 25 is provided with a mask 26. The mask 26 shields radiation except from holes 27 which let pass radiation in a specific pattern.

The surface is plasticized or softened in a regular pattern of limited surface spots or zones.

Inasmuch as the invention is subject to modifications and variations, the foregoing description and accompanying drawings should not be regarded as limiting the invention, which is defined by the following claims and various combinations thereof.

What is claimed is:

1. A blow moldable preform for making a closeable container, said preform made from a blank having one or more covering layers and comprising:
   (a) a blank provided with a plurality of protrusions on at least one side; and
   (b) at least one cover layer
      (1) engaging the side of the blank that has said protrusions thereon, and
      (2) forming a connecting zone by a plurality of thermally produced microweld positions.

2. A preform according to claim 1, wherein the microweld positions are located nearby said protrusions and the surface of the cover layer has complementary depressions for engaging said protrusions.

3. A preform according to claim 2, wherein the blank has an inner surface and an outer surface, and the protrusions are on its outer surface and the cover layer engages the outer surface.

4. A preform according to claim 2, wherein the blank has an inner surface and an outer surface, and the protrusions are on its inner surface and the cover layer engages the inner surface.

5. A preform according to claim 2, wherein the blank has an inner surface and an outer surface, and the protrusions are on its inner and outer surfaces and cover layers engage the inner and the outer surfaces.

6. A preform according to claim 1, wherein the connecting zone is formed by said protrusions and the protrusions extend approximately vertically to said connecting zone and have an approximate circular cross section.

7. A preform according to claim 1, wherein the connecting zone is formed by said protrusions, and wherein said protrusions possess a sealed structure.

8. A preform according to claim 1, wherein the protrusions have a height of about 0.25 mm to about 1.5 mm and a circular cross-sectional area of about 0.5 mm to about 44 mm.

9. A blow moldable preform for making a closable container, said preform made from a blank, having one or more covering layers, wherein the adjacent surfaces of two layers are bonded with one another in a connecting zone, said connecting zone comprising a plurality of thermally produced microweld positions.

* * * * *

UNITED STATES PATENT AND TRADEMARK OFFICE
CERTIFICATE OF CORRECTION

PATENT NO. : 5,894,041

DATED : April 13, 1999

INVENTOR(S) : Cornell

It is certified that error appears in the above-indentified patent and that said Letters Patent is hereby corrected as shown below:

Title page, item [57] Abstract;
    Line 16, delete "plasticised" and insert --plasticized-- therefor.
    Line 18, delete "plasticised" and insert --plasticized-- therefor.
    Line 25, delete "use-will" and insert --use will-- therefor.

Column 2, Line 8, delete "plasticised" and insert --plasticized-- therefor.
Column 2, Line 16, delete "plasticised" and insert --plasticized-- therefor.
Column 2, Line 20, delete "plasticised" and insert --plasticized-- therefor.
Column 2, Line 22, delete "plasticised" and insert --plasticized-- therefor.
Column 2, Line 29, delete "one o more" and insert --one or more-- therefor.
Column 2, Line 33, delete "step, plasticize" and insert --step, plasticized-- therefor.
Column 2, Line 34, delete "of the too" and insert --of the tool-- therefor.
Column 2, Line 48, delete "plasticised" and insert --plasticized-- therefor.
Column 2, Line 52, delete "Plasticised" and insert --Plasticized-- therefor.
Column 2, Line 59, delete "plasticised" and insert --plasticized-- therefor.
Column 3, Line 7, delete "plasticised," and insert --plasticized. - therefor.
Column 3, Line 10, delete "Plasticised" and insert --Plasticized-- therefor.
Column 3, Line 13, delete "plasticised" and insert --plasticized-- therefor.
Column 3, Line 20, delete "conceivable. with that." and insert --conceivable. With that, - therefor.
Column 3, Lines 66-67, delete "lie opposite on another." and insert --lie opposite one another. - therefor.
Column 4, Line 6, delete "plasticised" and insert --plasticized-- therefor.
Column 4, Line 39, delete "and z from 0.10 to".
Column 4, Lines 66-67, delete "Pref-erable the" and insert --Pref-erably the-- therefor.
Column 5, Line 12, delete "(resp. its protrusions)" and insert --(esp. its protrusions)-- therefor.
Column 6, Line 11, delete "plasticised." and insert --plasticized.-- therefor.
Column 6, Line 14, delete "plasticised" and insert --plasticized-- therefor.
Column 6, Line 16, delete "plasticised" and insert --plasticized-- therefor.

UNITED STATES PATENT AND TRADEMARK OFFICE
CERTIFICATE OF CORRECTION

PATENT NO. : 5,894,041
DATED : April 13, 1999
INVENTOR(S) : Cornell

It is certified that error appears in the above-indentified patent and that said Letters Patent is hereby corrected as shown below:

Column 6, Line 19, delete "plasticised" and insert --plasticized-- therefor.
Column 6, Line 27, delete "and-the" and insert --and the-- therefor.
Column 6, Line 38, delete "plasticised" and insert --plasticized-- therefor.
Column 6, Line 43, delete "plasticised" and insert --plasticized-- therefor.
Column 6, Line 55, delete "plasticised." and insert --plasticized.-- therefor.
Column 6, Line 57, delete "plasticised" and insert --plasticized-- therefor.
Column 6, Line 59, delete "that the" and insert --than the-- therefor.
Column 6, Line 59, delete "plasticised" and insert --plasticized-- therefor.
Column 6, Line 62, delete "plasticised" and insert --plasticized-- therefor.
Column 7, Lines 6 and 7, delete "with a opening" and insert --with an opening-- therefor.
Column 7, Line 21, delete "plasticised" and insert --plasticized-- therefor.
Column 7, Line 33, delete "plasticised" and insert --plasticized-- therefor.
Column 7, Line 37, delete "plasticised" and insert --plasticized-- therefor.
Column 7, Line 49, delete "plasticised" and insert --plasticized-- therefor.
Column 7, Line 52, delete "shows A method" and insert --shows a method-- therefor.
Column 10, Line 28 delete "a closable" and insert --a closeable-- therefor.

Signed and Sealed this

Thirtieth Day of November, 1999

Attest:

Q. TODD DICKINSON

*Attesting Officer*     *Acting Commissioner of Patents and Trademarks*